United States Patent
Stoppa et al.

(10) Patent No.: US 12,099,602 B2
(45) Date of Patent: Sep. 24, 2024

(54) SECURE PERIPHERAL COMPONENT ACCESS

(71) Applicant: Huawei Technologies Co., Ltd., Shenzhen (CN)

(72) Inventors: Igor Stoppa, Helsinki (FI); Jan-Erik Ekberg, Helsinki (FI); Santeri Salko, Helsinki (FI)

(73) Assignee: Huawei Technologies Co., Ltd., Shenzhen (CN)

( * ) Notice: Subject to any disclaimer, the term of this patent is extended or adjusted under 35 U.S.C. 154(b) by 263 days.

(21) Appl. No.: 17/728,619

(22) Filed: Apr. 25, 2022

(65) Prior Publication Data
US 2022/0245244 A1 Aug. 4, 2022

Related U.S. Application Data

(63) Continuation of application No. PCT/EP2019/078851, filed on Oct. 23, 2019.

(51) Int. Cl.
| | |
|---|---|
| *G06F 21/55* | (2013.01) |
| *G06F 13/24* | (2006.01) |
| *G06F 13/40* | (2006.01) |
| *G06F 21/85* | (2013.01) |

(52) U.S. Cl.
CPC ........... *G06F 21/556* (2013.01); *G06F 13/24* (2013.01); *G06F 13/4068* (2013.01); *G06F 21/554* (2013.01); *G06F 21/85* (2013.01)

(58) Field of Classification Search
CPC ...... G06F 21/556; G06F 21/85; G06F 21/554; G06F 13/24; G06F 13/4068
See application file for complete search history.

(56) References Cited

U.S. PATENT DOCUMENTS

| | | | | |
|---|---|---|---|---|
| 5,953,422 | A * | 9/1999 | Angelo | G06F 21/34 713/185 |
| 6,658,578 | B1 * | 12/2003 | Laurenti | G06F 9/3856 712/E9.032 |
| 6,754,759 | B1 * | 6/2004 | Cook | G06F 13/4027 715/740 |
| 7,322,042 | B2 | 1/2008 | Srinivasan et al. | |
| 9,262,340 | B1 | 2/2016 | Van Antwerpen | |
| 2005/0193259 | A1 | 9/2005 | Martinez et al. | |

(Continued)

OTHER PUBLICATIONS

Wikipedia "Software Guard Extensions," https://en.wikipedia.org/wiki/Software_Guard_Extensions, Total 6 pages (2020).

(Continued)

*Primary Examiner* — Azizul Choudhury
(74) *Attorney, Agent, or Firm* — Leydig, Voit & Mayer, Ltd.

(57) ABSTRACT

A device includes a non-maskable interrupt (NMI) signal path, a processor, and a peripheral component. The peripheral component may comprise secret data, such as a secret key. The processor may perform a preconfigured NMI interrupt service routine (ISR), in response to detecting a preconfigured signal in the NMI signal path. Access to at least a part of the peripheral component may be enabled in response to detecting the preconfigured signal in the NMI signal path. Thus, the processor may be able to access the secret data, for example, when the processor is running the NMI ISR.

18 Claims, 4 Drawing Sheets

(56) References Cited

U.S. PATENT DOCUMENTS

2007/0101424 A1 5/2007 Ravi et al.
2011/0087815 A1 4/2011 Kruglick

OTHER PUBLICATIONS

Wikipedia "Trusted execution environment," https://en.wikipedia.org/wiki/Trusted_execution_environment, Total 11 pages (2020).

* cited by examiner

SECURE PERIPHERAL COMPONENT ACCESS

CROSS-REFERENCE TO RELATED APPLICATIONS

This application is a continuation of International Application No. PCT/EP2019/078851, filed on Oct. 23, 2019, the disclosure of which is hereby incorporated by reference in its entirety.

FIELD

The disclosure relates to processor, and more particularly, to a device comprising a processor. Furthermore, the disclosure relates to corresponding methods and a computer program.

BACKGROUND

The security of data processing devices may be compromised in various ways. Some of such schemes do not even require the insertion of malicious program code into the memory of the device. Instead, an attacker may utilise non-malicious program code that is already in the memory of the device and manipulate the order in which this program code is executed in order to achieve malicious effects. Some examples of such schemes are return-oriented programming (ROP) and jump-oriented programming (JOP). As more and more devices are connected to the internet, the importance of security of such devices may become more essential.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

According to a first aspect, a device comprises: a non-maskable interrupt (NMI) signal path: a processor electrically coupled to the NMI signal path, wherein the processor is configured to: in response to detecting a preconfigured signal in the NMI signal path, perform a preconfigured NMI interrupt service routine (ISR); and a peripheral component electrically coupled to the NMI signal path, wherein the peripheral component is configured to: in response to detecting the preconfigured signal in the NMI signal path, enable access to at least a part of the peripheral component. With such configurations, the device may be able to, for example, improve security of the peripheral component. Since the peripheral access to at least a part of the peripheral component is enabled in response to the NMI, access of malicious program code running on the processor to the peripheral component can be limited.

In an implementation form of the first aspect the processor comprises an output electrically coupled to the NMI signal path. With such configurations, the device may be able to, for example, initiate the NMI using program code running on the processor.

In a further implementation form of the first aspect, the processor comprises a non-maskable interrupt (NMI) input and the NMI signal path is electrically coupled to the processor via the NMI input. With such configurations, the device may be able to, for example, force the processor to execute the NMI ISR in response to the NMI.

In a further implementation form of the first aspect, the device further comprises an interrupt controller comprising an output, wherein the NMI signal path is electrically coupled to the output of the interrupt controller. With such configurations, the device may be able to, for example, handle various interrupt sources.

In a further implementation form of the first aspect, the interrupt controller further comprises a first input and the processor comprises an output, wherein the output of the processor is electrically coupled to the first input of the interrupt controller. With such configurations, the device may be able to, for example, initiate the NMI using program code running on the processor.

In a further implementation form of the first aspect, the interrupt controller comprises a second input configured to receive external interrupt signals. With such configurations, the device may be able to, for example, initiate the NMI using program code running on the processor and/or using interrupt signals from other sources.

In a further implementation form of the first aspect, the device further comprises a memory and the processor is configured to perform the preconfigured NMI ISR according to a program code comprised in the memory, wherein at least a part of the memory that comprises the program code is write-protected. With such configurations, the device may be able to, for example, ensure that any malicious program code running on the processor cannot modify the NMI ISR.

In a further implementation form of the first aspect, the memory comprises a non-volatile memory and the processor is configured to execute the program code in place. With such configurations, the device may be able to, for example, reduce the effects of malicious program code previously run on the processor.

In a further implementation form of the first aspect, the processor is further configured to: during the preconfigured NMI ISR, access the peripheral component. With such configurations, the device may be able to, for example, enable access for the processor to the peripheral component when the processor is securely running the NMI ISR.

In a further implementation form of the first aspect, the processor is further configured to, during the preconfigured NMI ISR, sanitize a state of the processor. With such configurations, the device may be able to, for example, reduce the effects of malicious program code previously run on the processor that may have affected the state of the processor.

In a further implementation form of the first aspect, the device further comprises a volatile memory and the processor is further configured to, after performing the preconfigured NMI ISR, remove data related to the preconfigured NMI ISR from the volatile memory. With such configurations, the device may be able to, for example, prevent malicious program code that may run on the processor after the NMI ISR from accessing data related to the peripheral component.

In a further implementation form of the first aspect, the processor is further configured to, after performing the preconfigured NMI ISR, disable access to the peripheral component. With such configurations, the device may be able to, for example, prevent malicious program code that may run on the processor after the NMI ISR from accessing the peripheral component.

In a further implementation form of the first aspect, the processor is further configured to, during the preconfigured NMI ISR: identify a requested operation; and perform the requested operation using the peripheral component. With such configurations, the device may be able to, for example, perform operations requested by other program code while running the NMI ISR.

According to a second aspect, a method comprises: in response to detecting a preconfigured signal in a non-maskable interrupt (NMI) signal path, performing a preconfigured NMI interrupt service routine (ISR); and in response to detecting the preconfigured signal in the NMI signal path, enabling access to at least a part of a peripheral component.

The method according to the second aspect can be extended to implementation forms corresponding to the implementation forms of the device according to the first aspect. In particular, the method according to the second aspect may have implementation forms comprising the feature(s) of the corresponding implementation form of the client device.

The advantages of the method according to the second aspect and its implementations are the same as those for the corresponding implementation forms of the device according to the first aspect.

According to a third aspect, a computer program product comprising program code is configured to perform: the operation of detecting the preconfigured signal in the NMI signal path: the operation of performing the preconfigured NMI ISR; and the operation of enabling access to at least a part of the peripheral component according to the method of the second aspect when the computer program product is executed on a computer. The method may enable, for example, improving security of the peripheral component. Since the peripheral access to at least a part of the peripheral component is enabled in response to the NMI, access of malicious program code running on a processor to the peripheral component can be limited.

According to still a further aspect, the disclosure also relates to a (non-transitory) computer readable medium and said mentioned computer program code, wherein said computer program code is included in the computer readable medium, and the computer medium comprises of one or more from the group: Read-Only Memory (ROM), Programmable ROM (PROM), Erasable PROM (EPROM), Flash memory, Electrically EPROM (EEPROM) and hard disk drive.

Many of the attendant features will be more readily appreciated as they become better understood by reference to the following detailed description considered in connection with the accompanying drawings.

BRIEF DESCRIPTION OF THE DRAWINGS

The present description will be better understood from the following detailed description read in light of the accompanying drawings, wherein.

Like references are used to designate like parts in the accompanying drawings.

DETAILED DESCRIPTION

The detailed description provided below in connection with the appended drawings is intended as a description of exemplary embodiments and is not intended to represent the only forms in which the embodiment may be constructed or utilized. However, the same or equivalent functions and structures may be accomplished by different embodiments.

Figure 1:
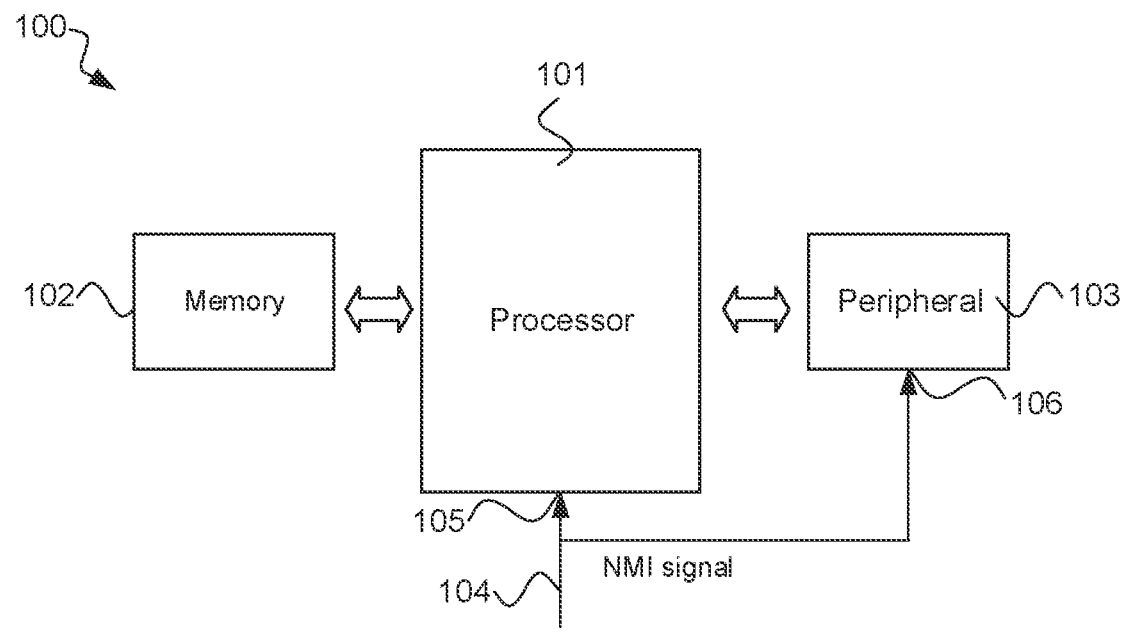
FIG. 1 illustrates a schematic representation of a device comprising a processor and a peripheral component according to an embodiment.

FIG. 1 illustrates a schematic representation of a device 100 according to an embodiment.

According to an embodiment, the device 100 comprises a non-maskable interrupt (NMI) signal path 104.

The NMI signal path 104 may comprise, for example, an electrical conductor, a wire, a trace on a printed circuit board, an electrical connection inside a field-programmable gate array (FPGA), and/or any other signal path via which an NMI signal can propagate.

The device 100 may further comprise a processor 101. The processor 101 may be electrically coupled to the NMI signal path.

The processor 101 may be configured to, in response to detecting a preconfigured signal in the NMI signal path 104, perform a preconfigured NMI interrupt service routine (ISR).

The processor 101 may, for example, perform the preconfigured NMI ISR by executing the preconfigured NMI ISR. The processor 101 may, for example, execute program code that is configured to cause the processor 101 to perform the preconfigured NMI ISR when the program code is executed on the processor 101.

Herein, "non-maskable interrupt" may refer to an interrupt that the processor 101 cannot ignore/mask. Thus, any software may not be able to prevent the processor 101 from executing the NMI ISR.

The preconfigured signal may comprise, for example, an interrupt signal, a non-maskable interrupt signal, a hardware interrupt signal, an interrupt request, a hardware interrupt request, or similar.

The preconfigured NMI ISR may also be referred to as an interrupt handler. When the processor 101 is executing the preconfigured NMI ISR, the processor 101 may be referred to as being in a secure mode.

The processor 101 may comprise a non-maskable interrupt (NMI) input 105 and the NMI signal path may be electrically coupled to the processor 101 via the NMI input 105.

The NMI input 105 may also be referred to as an NMI connector, an NMI pin, or similar. The NMI input 105 may correspond to a physical connector on the processor 101. The NMI input 105 may correspond to any connector on the processor 101 capable of receiving interrupt signals. Alternatively or additionally, the NMI input 105 may be an internal input of the processor 101. For example, if the NMI signal path 104 is an internal signal path, the NMI input 105 may not be an external connector of the processor 101.

The device 100 may further comprise a peripheral component 103. The peripheral component 103 may be electrically coupled to the NMI signal path 104.

For example, the peripheral component 103 may comprise an enable connector 106. The NMI signal path 104 may be electrically coupled to the enable connector 106. The enable connector 106 may also be referred to as an enable pin. The enable connector may correspond to a physical connector on the peripheral component 103.

The peripheral component 103 may comprise, for example, a peripheral device, an expansion card, an expansion board, an adapter card, an accessory card, an accessory component, an accessory device, or similar.

The peripheral component 103 may be electrically coupled and/or functionally coupled to the processor 101 using, for example, a data bus. Thus, the processor 101 may access the peripheral component and/or some parts of the peripheral component 103 when access to the peripheral component 103 is enabled. For example, if the peripheral component 103 comprises memory, the processor 101 may be configured to read that memory.

The peripheral component 103 may be configured to, in response to detecting the preconfigured signal in the NMI signal path 104, enable access to at least a part of the peripheral component.

After the peripheral component 103 has enabled access to at least the part of the peripheral component 103, the processor 101 may, for example, access at least the part of the peripheral component 103. The processor 101 may, for example, fetch data from the peripheral component 103.

In some embodiments, the peripheral component 103 may enable access to the whole peripheral component. In other embodiments, the peripheral component 103 may enable access to a smaller part of the peripheral component 103. This may be the case when, for example, the peripheral component 103 is a more complex component. For example, if the peripheral component 103 comprises a memory and other components, the peripheral component 103 may enable access only to the memory of the peripheral component 103.

Disabling of the peripheral component 103 can be controlled, for example, by the NMI ISR. For example, before returning to normal execution, the processor 101 may disable access to the peripheral component 103. Alternatively, disabling the peripheral component 103 can be controlled by some hardware. NMI signal path 104 may not stay active for the entire duration of the NMI ISR.

Since the processor 101 and the peripheral component 103 are electrically coupled to the NMI signal path 104, the processor 101 may perform the preconfigured NMI ISR and the peripheral component 103 may enable access to the peripheral component 103 substantially at the same time. Thus, the peripheral component 103 may be available to the processor 101 only when the processor 101 is executing the NMI ISR.

In some embodiments at least some parts of the device 100 may be implemented as a system on a chip (SoC). For example, the processor 101, the peripheral component 103, the NMI signal path 104 and/or other components of the device 100 may be implemented using a field-programmable gate array (FPGA).

Components of the device 100, such as the processor 101 and the peripheral component 103, may not be discrete components. For example, if the device 100 is implemented using a SoC, the components may correspond to different units of the SoC.

The device 100 may further comprise a memory 102. The processor 101 may be configured to perform the preconfigured NMI ISR according to a program code comprised in the memory 102. At least a part of the memory 102 that comprises the program code may be write-protected.

Since the NMI ISR may determine the behaviour of the processor 101 when the peripheral component 103 is accessible, security of the device 100 may be improved, if the NMI ISR is in write-protected memory.

The memory 102 may comprise a non-volatile memory and the processor 101 may be configured to execute the program code in place. Execution in place, XIP, may refer to an operation where the processor 101 executes the program code directly from the non-volatile memory instead of loading the program code into RAM and executing the program code from the RAM.

The processor 101 may be further configured to, during the preconfigured NMI ISR, access the peripheral component 103. The processor 101 may, for example, fetch data from the peripheral component 103 during execution of the ISR.

The processor 101 may be further configured to, during the preconfigured NMI ISR, sanitize a state of the processor 101. For example, the processor 101 may clear the call stack of the processor 101 and/or any memory, such as cache memory, comprised in the processor 101. This way, the processor 101 may be able to mitigate any attacks in the case that compromised program code has been executed on the processor 101 before the ISR execution, since the compromised program code may not be able to affect the internal state of the processor 101 during the execution of the preconfigured NMI ISR.

The device 100 may further comprise a volatile memory and the processor 101 may be further configured to, after performing the preconfigured NMI ISR, remove data related to the preconfigured NMI ISR from the volatile memory. The processor 101 may, for example, remove form the memory 102, cache memory, and/or any other memory secret information that processor 101 fetched from the peripheral component 103 during the ISR. Thus, if the processor 101 continues to execute malicious program code after executing the ISR, leaking of the secret data may be prevented.

The processor 101 may be further configured to, after performing the preconfigured NMI ISR, disable access to the peripheral component 103. Thus, if the processor 101 executes malicious program code after executing the NMI ISR, the peripheral component 103 is no longer accessible and the malicious program code may not be able to access the peripheral component 103.

The processor 101 may comprise, for example, one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The memory 102 may be configured to store, for example, computer programs and the like. The memory 102 may include one or more volatile memory devices, one or more non-volatile memory devices, and/or a combination of one or more volatile memory devices and non-volatile memory devices. For example, the memory 102 may be embodied as magnetic storage devices (such as hard disk drives, floppy disks, magnetic tapes, etc.), optical magnetic storage devices, and semi-conductor memories (such as mask ROM, programmable ROM (PROM), erasable PROM (EPROM), flash ROM, random access memory (RAM), etc.).

The device 100 may further comprise a transceiver. The transceiver may be configured to, for example, transmit and/or receive data using, for example, a 3G, 4G, 5G, LTE, or WiFi connection.

The aforementioned components 101-103 may be connected via a data bus. The processor 101 may access data and/or program code comprised in the memory 102 and/or data comprised in the peripheral component 103 via the data bus.

The device 100 may also comprise other component and/or parts not illustrated in the embodiment of FIG. 1.

The processor 101 may not require additional complex hardware for implementing the secure operation of the preconfigured NMI ISR. For example, the processor 101 may not need additional hardware for saving/restoring of the processor state. Thus, the device 100 may be suitable in applications which may be cost and/or size constrained, like microcontrollers.

If, for example, the state of the processor 101 was saved/restored, the transition to a NMI ISR and back could be quite expensive time-wise due to the quantity of registers to save/restore. Such limitation may act as an upper bound to the number of cases where the such solution could be used, because it is not always compatible with latency requirements of very time-constrained applications. The device 100 may mitigate such effects, since such saving and/or restoring may not be needed.

Other solutions may also create a kind of inter-processor communication (IPC) where the same processor may exhibit a form of dualism and behave alternatively as both actors of the IPC scenario. In such a scenario, each side, regular mode and NMI ISR may have an own set of libraries, even if potentially identical, ending with a potentially larger memory footprint than in the case where such code would be shared. This may prevent wider utilization of such solutions in, for example, low-cost systems. The device 100 may mitigate such effects.

Herein, "regular mode" may refer to normal operational mode of the processor 101. In the regular mode, the processor 101 may read instructions and data from memory and execute the instructions. Regular mode may refer to any operations the processor 101 performs when the processor is not executing the NMI ISR.

Thus, the device 100 may have a smaller memory footprint (no duplicated code). The device 100 may have reduced hardware footprint (less duplication of HW state). The device 100 may be able to provide a higher level of security.

The execution of the NMI ISR may not be preventable by an attacker even if the regular execution has been completely subverted by the attacker. The attacker may not be able to interrupt the execution of the NMI ISR either to, for example, wrestle a protected resource out of the NMI ISR.

The processor 101 may already support the context switching required by the execution of the NMI ISR. Thus, there may be no need for additional hardware.

The NMI signal path 104 may also unlock the peripheral component 103 associated with the secure context. The NMI signal path 104 may even be the only way to perform such unlocking. A software-initiated transition to the NMI ISR may still need to pass through the triggering of the NMI. This may make a pure ROP/JOP based attack to unlock said secure peripherals at least more difficult.

Since the binary object associated with the NMI ISR can be obtained as part of the regular mode, all the executable objects available to the regular mode can also be available to the NMI ISR. Thus, the need for extended memory footprint due to code duplication may be removed. Such functions may have to be stateless, so that both the regular and the NMI ISRs can use them.

In some embodiments, the NMI ISR cannot be modified by the attacker. This requirement may be satisfied in cases where the ISR is located in flash memory and the code is run as execute in place (XIP), with very limited scenarios where the running code can modify itself. This may be the case for example in microcontrollers.

The NMI ISR may be configured to identify the source of the NMI and the request received. The NMI ISR may also be configured to handle the specific request received, which might involve driving some peripheral 103. The NMI ISR may be configured to tear down whatever secure context might not be automatically destroyed upon exiting the NMI ISR.

The device 100 may provide means to limit the access to protected context (data and/or resources), such as the peripheral component 103, to the NMI ISR. The device 100 may provide means to automatically enable access to the protected context, in a way that cannot be tampered with by software. The device 100 may provide means to disable access to the protected context, either automatically or through software. The device 100 may allow both external and internal events to invoke a transition to the NMI ISR, with internal events meaning transitions required by the regular mode, when it needs a service. The device 100 may provide means to identify univocally the origin of the event, without the regular mode being able to tamper with it. The device 100 may provide means to identify univocally the service being requested by an internal event.

The device 100 can be employed, for example, wherever there is a microprocessor or a microcontroller running less trusted/untrusted software or in some way exposed to potential malicious data flow and it is desirable to retain a high level of trust on a subset of its operations.

The device 100 may be used to introduce additional modes in existing designs, especially low-cost embedded microcontrollers. However, the device 100 could also be used as an extension to systems where it would be desirable to achieve a certain degree of isolation, without incurring in the penalty of using a fully separated secure mode, such as trusted execution environment.

Functionality described herein may be implemented via the various components of the device 100. For example, the memory 102 may comprise program code for performing any functionality disclosed herein, and the processor 101 may be configured to perform the functionality according to the program code comprised in the memory 102.

When the device 100 is configured to implement some functionality, some component and/or components of the device 100, such as the at least one processor 101 and/or the memory 102, may be configured to implement this functionality. Furthermore, when the at least one processor 101 is configured to implement some functionality, this functionality may be implemented using program code comprised, for example, in the memory 102. For example, if the device 100 is configured to perform an operation, the at least one memory 102 and the computer program code can be configured to, with the at least one processor 101, cause the device 100 to perform that operation.

Figure 2:
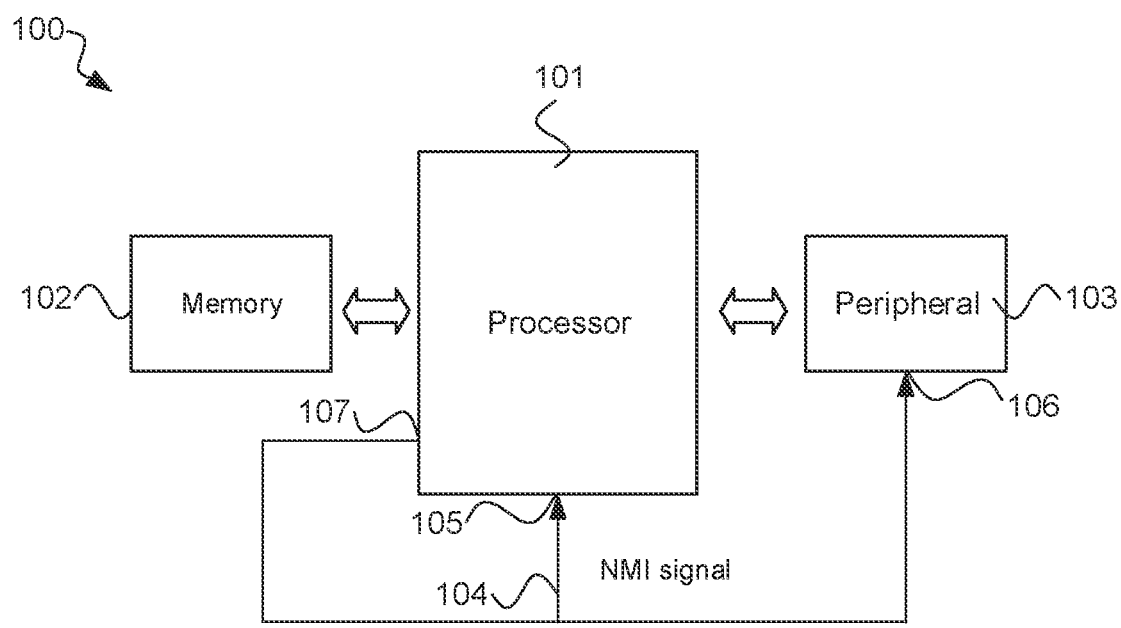
FIG. 2 illustrates a schematic representation of a device comprising a processor having an output according to a further embodiment.

FIG. 2 illustrates a schematic representation of a device 100 wherein the processor 101 comprises an output 107 according to an embodiment.

According to an embodiment, the processor 101 comprises an output 107 electrically coupled to the NMI signal path 104. The processor 101 may be configured to transmit the preconfigured signal using the output 107. This way, the processor 101 may invoke execution of the NMI ISR and enabling access to the peripheral component 103. Thus, ordinary program code may invoke execution of the NMI ISR and enabling access to the peripheral component 103. Even if the output 107 is used by malicious program code, since the processor 101 is forced to execute the NMI ISR, the malicious program code may still not be able to access the peripheral component 103.

In some embodiments the device 100 or at least some components of the device 100 may be implemented as a system on a chip (SoC). In such cases, the NMI signal path 104 may be positioned at least partially inside the SoC.

For example, an output 107 of the processor 101 may be electrically coupled to the NMI signal path 104. The output 107 and at least part of the NMI signal path 104 may be located inside the SoC. Such an implementation may not support external interrupt signals and may not comprise an interrupt controller 108.

The peripheral component 103 may be implemented inside the same SoC or outside the SoC. If the peripheral component 103 is located inside the SoC, the NMI signal path 104 may also be fully located inside the SoC. If the peripheral component 103 is located outside the SoC, at least part of the NMI signal path 104 may also be located outside the SoC so that the peripheral component 103 can be electrically coupled to the NMI signal path 104.

The processor 101 may activate the output 107 by, for example, writing certain value to a specific register which controls the output 107. The register can be dictated by the external wiring.

For example, if the device 100 is implemented using an FPGA, it may be possible to create an ad-hoc register and wire the register internally to the NMI signal path 104.

Certain memory data operation (ex: read or write) from a specific location (possibly using a specific value) can be used to trigger the interrupt synchronously from the device 100 itself. For example, If "1" is written to a specific bit either in a register or in a memory location which are associated to the output wired to the NMI signal path, the processor 101 may transmit an interrupt signal to the NMI signal path 104. For example, if processor 101 reads certain memory location (where for example a sensor could be mapped), this may also trigger the NMI signal path 104.

The NMI signal 104 path may be triggered when a memory read cycle is detected at a specific address. The read could be such that it always stores the value in a specific register, which then the NMI ISR will process.

Figure 3:
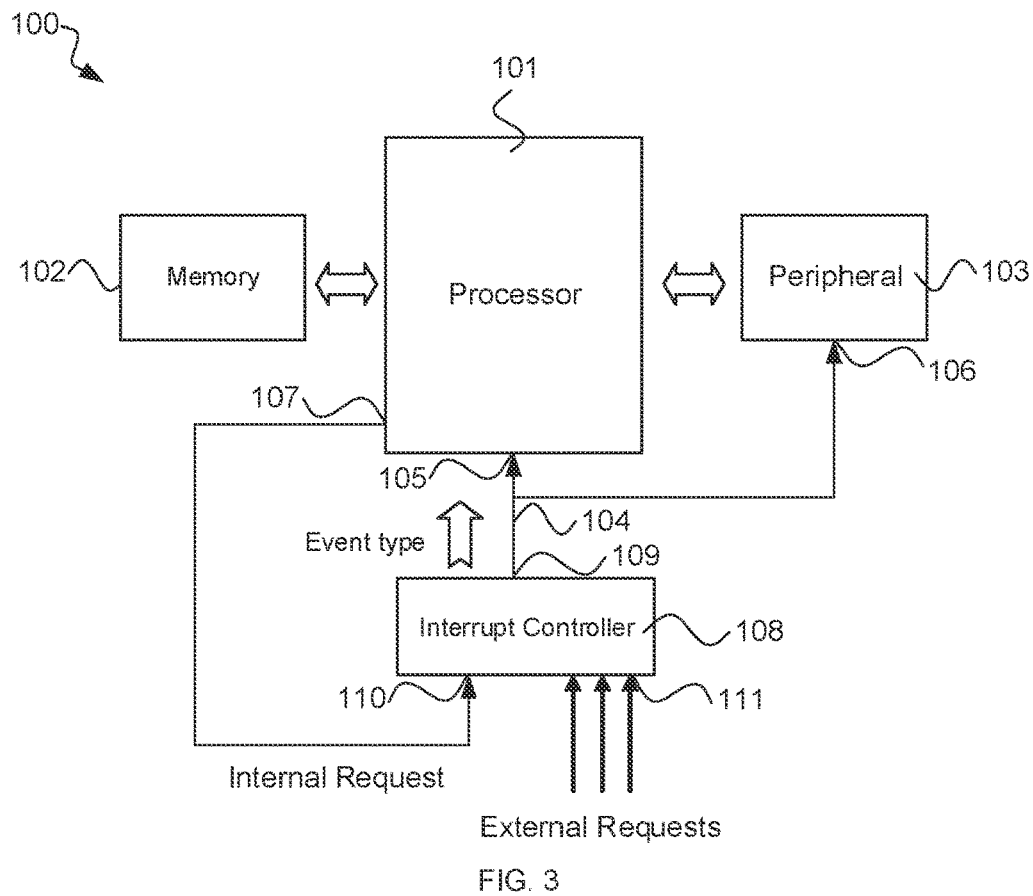
FIG. 3 illustrates a schematic representation of a device further comprising an interrupt controller according to a further embodiment.

FIG. 3 illustrates a schematic representation of a device 100 further comprising an interrupt controller 108 according to an embodiment.

According to an embodiment, the device 100 further comprises an interrupt controller 108 comprising an output 109. The NMI signal path 104 may be electrically coupled to the output 109 of the interrupt controller. The output 109 of the interrupt controller 108 may correspond to an output connector on the interrupt controller 108. Alternatively, the interrupt controller 108 may be implemented as a part of a SoC, and the output 108 may be an internal part of the SoC.

The interrupt controller 108 may further comprise a first input 110. The output 107 of the processor 101 may be electrically coupled to the first input 110 of the interrupt controller 108. Thus, the output 107 of the processor 101 may be electrically coupled to the NMI signal path 104 via the interrupt controller 108.

The output 107 of the processor 101 may comprise, for example, an input-output connector, an input-output pin, and/or a general-purpose input/output (GPIO) connector/pin. Alternatively, the processor 101 may be implemented as a part of a SoC, and the output 107 may be an internal part of the SoC.

The processor 101 may be configured to invoke an NMI using the output 107. For example, program code running on the processor 101 may invoke an NMI using the output 107. Thus, the program code may invoke the processor 101 to transition into executing the NMI ISR.

The NMI signal path 104 may trigger the execution of the NMI ISR by the processor 101. The execution may be in response to an external event, typically triggered by a peripheral (ex: character available on secure serial port), or an internal request, generated by looping a specific output line with the NMI (ex: connect a GPIO in out mode to the NMI).

The interrupt controller 108 may comprise a second input 111 configured to receive external interrupt signals.

The interrupt controller 108 may comprise one or more inputs. The second input 111 may be electrically coupled to, for example, a peripheral component 103. The peripheral component 103 may be configured to invoke an NMI using the second input 111 of the interrupt controller 108.

For example, the peripheral component 103 may comprise a sensor, such as a temperature sensor. When a new measurement result/value is available for the processor 101 from the sensor, the sensor may invoke an NMI. The interrupt controller 108 may then enable access to the sensor using the NMI signal path 104. The processor 101 may also transition into the NMI ISR in response to the interrupt signal in the NMI signal path 104. Thus, the processor 101 may fetch the new measurement result from the sensor during the NMI ISR.

Figure 4:
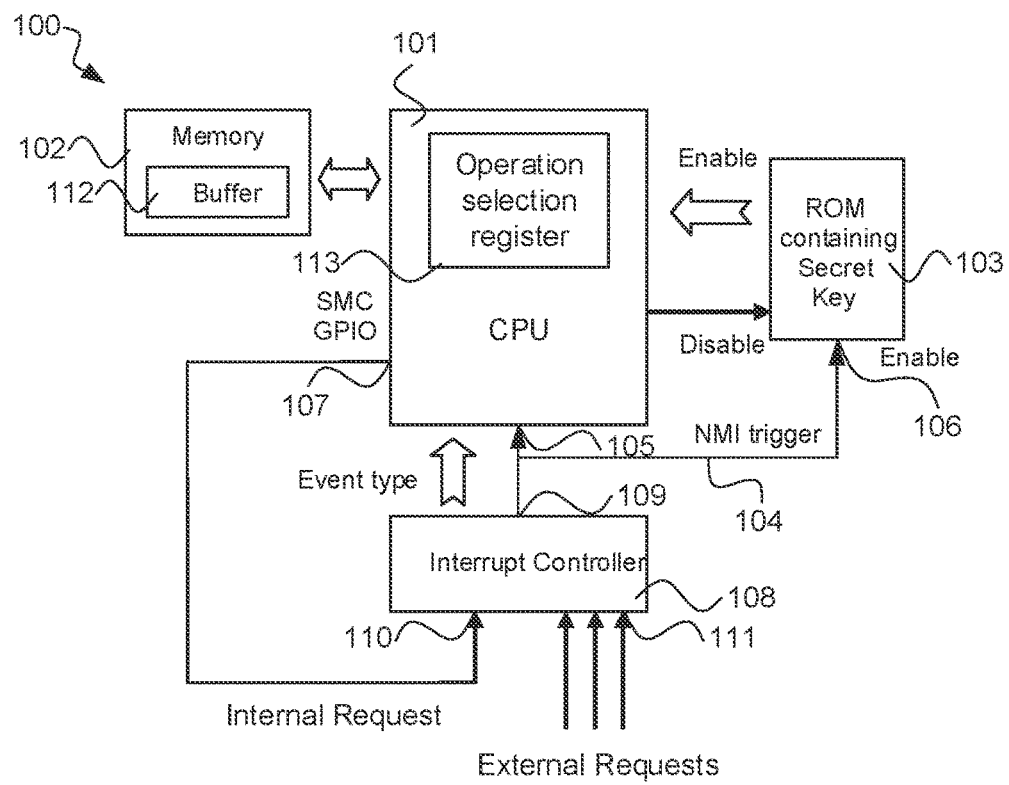
FIG. 4 illustrates a schematic representation of a device configured for buffer signing using a secret key according to a further embodiment.

FIG. 4 illustrates a schematic representation of a device 100 configured for buffer signing using a secret key according to an embodiment.

In the embodiment of FIG. 4 the device 100 may be configured to, for example, sign a buffer using the NMI ISR. The NMI ISR may access a secret key that is not available to the regular mode.

The device 100 may comprise a preconfigured secret key that it can use to sign certain content. The key may be stored in a location which can be accessed exclusively by the NMI ISR. The peripheral component 103 may comprise the secret key.

The processor 101 may load in the regular mode data/message to be signed into a buffer 112 in the memory 102.

The processor 101 may, in the regular mode, store into a specific location/register the ID of the operation it requests the NMI ISR to perform, such as signing the buffer.

The processor 101 may, for example, in the regular mode, store into a specific location/register the address of the buffer 112.

The processor 101 may, in the regular mode, invoke the NMI ISR, according to the exemplary design of the device 100. For example, the processor 101 may toggle the output 107 that is connected to the NMI signal path 104 through the interrupt controller 108.

The processor 101 may be configured to identify a requested operation and perform the requested operation using the peripheral component.

For example, after the transition into NMI ISR, the processor 101 may identify the cause of the transition. The processor 101 may, for example, read the event type from the interrupt controller 108. In response to identifying that the transition was initiated by an internal source, rather than a peripheral, the processor 101 may decode the requested operation by reading it from the predefined location/register in the processor 101.

The peripheral component 103 may comprise a non-volatile memory and the processor 101 may be further configured to, during the preconfigured NMI ISR, access data comprised in the non-volatile memory.

The device according to claim 12, wherein the non-volatile memory comprises an authentication key, and the processor is configured to, during the preconfigured NMI ISR, access the authentication key sign a buffer 112 using the authentication key.

For example, after identifying the required operation to be buffer signing, the processor 101 may, in the NMI ISR, access the privileged secure location containing the key. The processor 101 may, in the NMI ISR, use the key to sign the buffer 112.

After signing the buffer, the processor 101 may remove any trace of the secret key and/or disable access to the peripheral component 103 comprising the secret key.

The processor 101 may then return to regular mode, where at least some of the secure features, such as the access to the peripheral component 103, can be disabled. The disabling command toward the ROM allows the processor 101 to prevent the regular mode from accessing to the restricted data, once the NMI ISR has completed.

The NMI may represent a mechanism of transitioning the processor 101 into a known, tamper-free execution mode. The NMI may also act as a unique enabler for accessing the protected content (in this case the secret key, stored in the peripheral component 103), ensuring that a compromised regular mode cannot use any technique, such as ROP/JOP to gain access.

The interrupt controller 108 may provide means to support multiple requestors of transition to NMI ISR, while at the same time identifying which one was responsible for the request.

Hard-wiring a specific GPIO of the processor 101 to the interrupt controller 108 may generate a NMI ISR invocation when the GPIO is activated.

Figure 5:
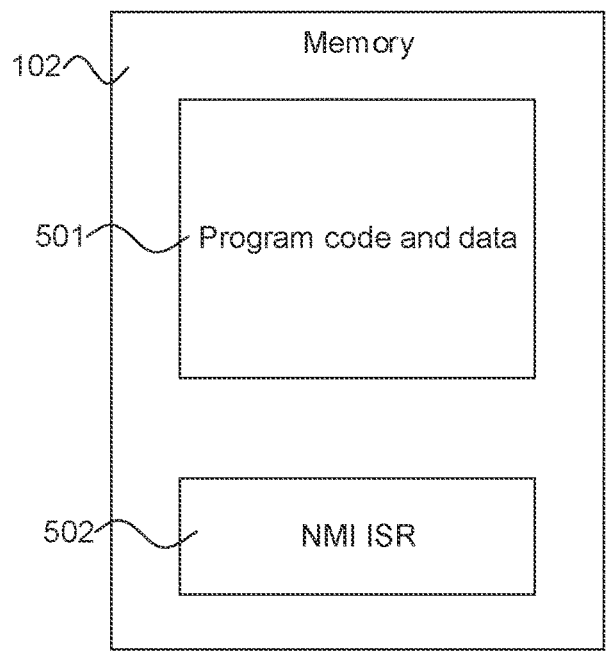
FIG. 5 illustrates a schematic representation of a memory comprising program code and an interrupt service routine according to an embodiment.

FIG. 5 illustrates a schematic representation of a memory 102 according to an embodiment.

The memory 102 may comprise normal program code and data 501. The memory 102 may further comprise program code for the NMI ISR 502.

The processor 101 may be configured to perform the preconfigured NMI ISR according to a program code comprised in the memory 102, wherein at least a part of the memory 102 that comprises the program code is write-protected. For example, the part of the memory 102 comprising the program code for the ISR may be write protected using software. Alternatively or additionally, the memory 102 may be of read-only type. For example, the memory 102 may comprise read-only memory (ROM) or write-protected flash memory. The write-protection may prevent a possible attacker from modifying the functionality of the NMI ISR.

The processor 101 may be configured to execute the program code in place. When the processor 101 utilises execute in place (XIP), the processor 101 may execute the program code directly from the memory 102 instead of copying the program code into random-access memory (RAM). This may further prevent malicious use of the device 100, since any attack on the RAM may not affect the NMI ISR, when the program code is executed in place.

Both the functionality of the regular mode and of the NMI ISR may be provided by one single binary object.

The NMI ISR may have a full access to whatever context and code is present in the regular mode without the need for utilizing special means to share objects across different binary components.

The security of the NMI ISR may be due to the hardware-driven enabling of peripheral component 103 through the NMI signal path 104.

In cases where the regular mode has been compromised, even attempting to hijack part of the NMI ISR through ROP/JOP may not yield any favourable result, as the peripheral component 103 will not be available due to lack of triggering of the line NMI signal path and the attempt may fail and/or cause a crash.

To harden the device 100, the NMI ISR can also perform health checks on the regular mode, both code and data, to ensure that its services are invoked by a healthy system.

Figure 6:
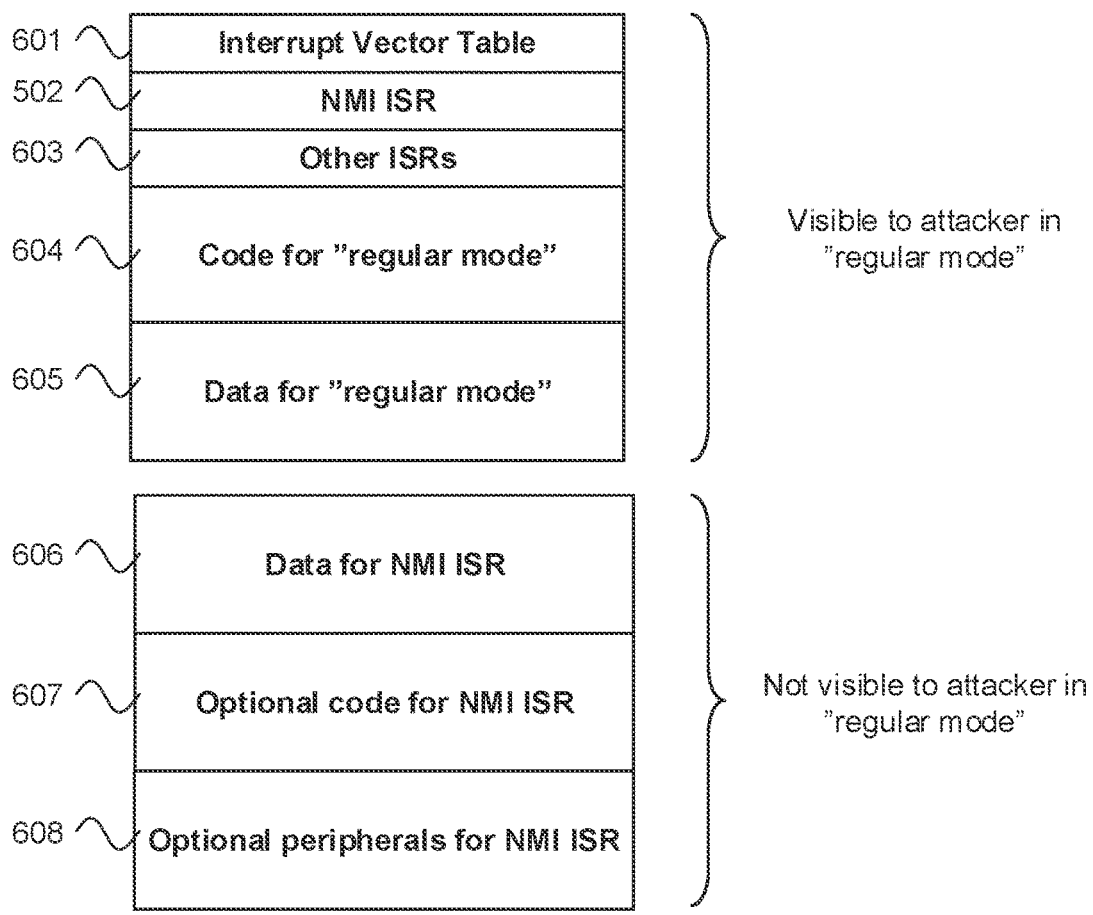
FIG. 6 illustrates a schematic representation of code and data types according to an embodiment.

FIG. 6 illustrates a schematic representation of data and code types according to an embodiment. The code and/or data presented in the embodiment of FIG. 6 may be comprised, for example, in the memory 102 and/or in the peripheral component 103.

The memory 102 may comprise an interrupt vector table 601. The interrupt vector table 601 may comprise a data structure that associates a list of ISRs with a list of interrupt requests. Each entry of the interrupt vector table 601 may comprise the address of an ISR. Based on the interrupt vector table 601, the processor may deduce the ISR to be executed.

The memory 102 may comprise an NMI ISR 502. The memory 102 may also comprise one or more other ISRs 603. The other ISRs 603 may correspond to other interrupts (other than the non-maskable interrupts) that the processor 101 may receive.

The memory 102 may comprise program code 604 and/or data 605 for regular mode. The processor 101 may be configured to implement various functionality using the program code 604 and the data 605. While implementing that functionality, the processor 101 may receive and NMI and transition to executing the NMI ISR 502.

If the device 100 is attacked, the interrupt vector table 601, the NMI ISR 502, the other ISRs 603, and the program code 604 and the data 605 for the regular mode may be visible to the attacker.

The peripheral component 103 may comprise data 606 and program code 607 for the NMI ISR. Furthermore, some optional peripherals 608 may be visible only to the NMI ISR.

Figure 7:
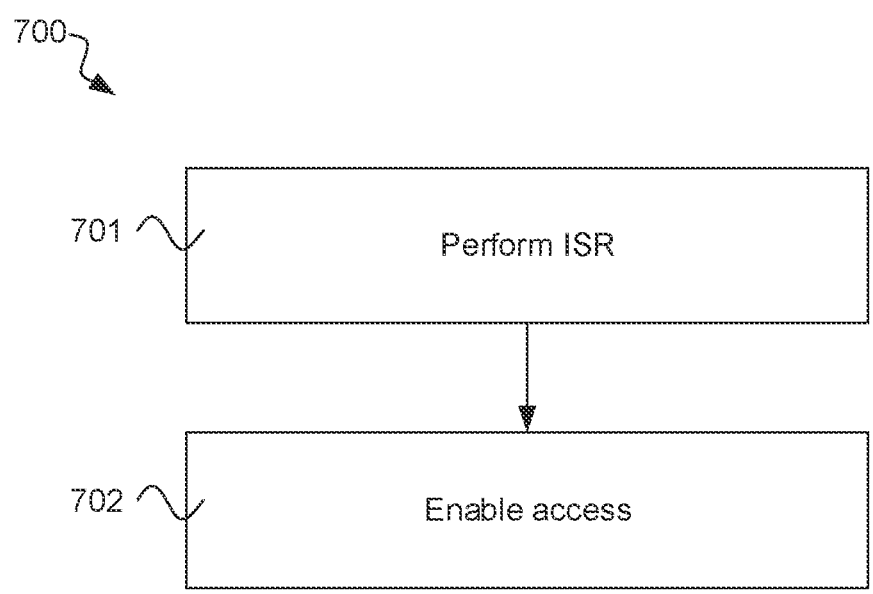
FIG. 7 illustrates a flow chart representation of a method according to an embodiment.

FIG. 7 illustrates a flow chart representation of a method 600 according to an embodiment.

The method 700 may comprise, in response to detecting a preconfigured signal in a non-maskable interrupt, NMI, signal path, performing 701 a preconfigured NMI interrupt service routine, ISR. The operation 701 may be performed by, for example, the processor 101 of the device 100.

The method 700 may further comprise, in response to detecting the preconfigured signal in the NMI signal path, enabling 702 access to at least a part of a peripheral component. The operation 702 may be performed by, for example, the peripheral component 103 of the device 100.

Although some of the subject matter has been described in language specific to structural features and/or acts, it is to be understood that the subject matter defined in the appended claims is not necessarily limited to the specific features or acts described above. Rather, the specific features and acts described above are disclosed as embodiments of implementing the claims and other equivalent features and acts are intended to be within the scope of the claims.

The functionality described herein can be performed, at least in part, by one or more computer program product components such as software components. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items. The term 'and/or' may be used to indicate that one or more of the cases it connects may occur. Both, or more, connected cases may occur, or only either one of the connected cases may occur.

The operations of the methods described herein may be carried out in any suitable order, or simultaneously where appropriate. Additionally, individual blocks may be deleted from any of the methods without departing from the scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, embodiments and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

What is claimed is:

1. A device comprising:
   a non-maskable interrupt (NMI) signal path;
   a non-volatile memory storing a program code;
   a processor electrically coupled to the NMI signal path and the non-volatile memory, wherein the processor is configured to:
      in response to detecting a preconfigured signal in the NMI signal path, perform a preconfigured NMI interrupt service routine (ISR) by executing in place (XIP), from the non-volatile memory, the program code stored in the non-volatile memory, wherein at least a part of the non-volatile memory that stores the program code is write-protected; and
   a peripheral component electrically coupled to the NMI signal path, wherein the peripheral component is configured to:
      in response to detecting the preconfigured signal in the NMI signal path, enable an access to at least a part of the peripheral component.

2. The device according to claim 1, wherein the processor comprises an output electrically coupled to the NMI signal path.

3. The device according to claim 1, wherein the processor comprises a non-maskable interrupt (NMI) input and the NMI signal path is electrically coupled to the processor via the NMI input.

4. The device according to claim 1, further comprising:
   an interrupt controller comprising an output, wherein the NMI signal path is electrically coupled to the output of the interrupt controller.

5. The device according to claim 4, wherein the interrupt controller further comprises a first input and the processor further comprises an output, wherein the output of the processor is electrically coupled to the first input of the interrupt controller.

6. The device according to claim 5, wherein the interrupt controller comprises a second input configured to receive external interrupt signals.

7. The device according to claim 1, wherein the processor is further configured to:
   during the preconfigured NMI ISR, access the peripheral component.

8. The device according to claim 1, wherein the processor is further configured to:
   during the preconfigured NMI ISR, sanitize a state of the processor.

9. The device according to claim 1, the device further comprising:
   a volatile memory,
   wherein the processor is further configured to:
      after performing the preconfigured NMI ISR, remove data related to the preconfigured NMI ISR from the volatile memory.

10. The device according to claim 1, wherein the processor is further configured to:
    after performing the preconfigured NMI ISR, disable the access to the peripheral component.

11. The device according to claim 1, wherein the processor is further configured to:
    during the preconfigured NMI ISR:
       identify a requested operation; and
       perform the requested operation using the peripheral component.

12. A method for operating a device comprising a non-maskable interrupt (NMI) signal path, a non-volatile memory, a processor electrically coupled to the NMI signal path and the non-volatile memory, and a peripheral component, the method comprising:
    in response to detecting a preconfigured signal in the NMI signal path, performing, by the processor, a preconfigured NMI interrupt service routine (ISR) by executing in place (XIP), from the non-volatile memory, a program code stored in the non-volatile memory, wherein at least a part of the non-volatile memory that stores the program code is write-protected; and
    in response to detecting the preconfigured signal in the NMI signal path, enabling, by the peripheral component, an access to at least a part of the peripheral component.

13. A non-transitory computer-readable medium having stored thereon a program code that, when executed by a computing device, causes the computing device to perform the method according to claim 12.

14. The non-transitory computer-readable medium according to claim 13, wherein the program code further causes the device to: during the preconfigured NMI ISR, access the peripheral component.

15. The method according to claim 12, further comprising:
   during the preconfigured NMI ISR, accessing, by the processor, the peripheral component.

16. The method according to claim 12, further comprising:
   during the preconfigured NMI ISR, sanitizing, by the processor, a state of the processor.

17. The method according to claim 12, further comprising:
   after performing the preconfigured NMI ISR, disabling, by the processor, the access to the peripheral component.

18. The method according to claim 12, further comprising:
   during the preconfigured NMI ISR,
   identifying, by the processor, a requested operation; and
   performing, by the processor, the requested operation using the peripheral component.

\* \* \* \* \*